United States Patent
Carollo et al.

(10) Patent No.: US 6,674,576 B1
(45) Date of Patent: Jan. 6, 2004

(54) METHOD AND APPARATUS FOR UNOBSTRUCTED TELESCOPIC COMMUNICATIONS

(75) Inventors: Jerome T. Carollo, Carlsbad, CA (US); Michael J. Hoppe, Vista, CA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 50 days.

(21) Appl. No.: 09/970,380

(22) Filed: Oct. 3, 2001

Related U.S. Application Data
(60) Provisional application No. 60/239,021, filed on Oct. 4, 2000.

(51) Int. Cl.[7] .......................... G02B 27/28; G02B 5/10; H04B 10/00
(52) U.S. Cl. ...................... 359/485; 359/483; 359/857; 398/152; 398/118
(58) Field of Search .................. 359/483, 485, 359/487, 494, 495, 156; 398/152

(56) References Cited

U.S. PATENT DOCUMENTS

| | | | | |
|---|---|---|---|---|
| 2,736,895 A | * | 2/1956 | Cochrane | 343/755 |
| 3,340,535 A | * | 9/1967 | Damonte et al. | 343/756 |
| 3,748,020 A | * | 7/1973 | Fischer et al. | 359/723 |
| 4,579,422 A | * | 4/1986 | Simoni et al. | 349/176 |
| 4,960,315 A | * | 10/1990 | Kostal et al. | 359/173 |
| 5,237,331 A | * | 8/1993 | Henderson et al. | 342/54 |
| 5,500,520 A | * | 3/1996 | Komine | 250/203.1 |
| 5,710,652 A | * | 1/1998 | Bloom et al. | 359/152 |
| 5,715,023 A | * | 2/1998 | Hoppe | 349/11 |
| 5,975,703 A | * | 11/1999 | Holman et al. | 349/9 |
| 6,038,054 A | * | 3/2000 | Sakai et al. | 359/253 |
| 6,384,944 B1 | * | 5/2002 | Takayama et al. | 359/152 |

OTHER PUBLICATIONS

Warren L. Stutzman and Gary A. Thiele, Antenna Theory and Design, Section 1.7, "Reciprocity and Antenna Pattern Measurements", pp. 40–47. John Wiley & Sons, publishing, (c) 1981.*

Eugene Hecht, OPTICS, Third edition, Sections 4.5 "Fermat's Principle" and 10.1 "Preliminary Considerations", pp. 105–109 & 433–442, Addison–Wesley publishing, (c) 1998.*

Pending application 60/239021 filed Oct. 4, 2000, entitled "Ultra–Compact Telescope For Free Space Optical Communication", by Jerome T. Carollo and Michael J. Hoppe.

* cited by examiner

*Primary Examiner*—John Juba
(74) *Attorney, Agent, or Firm*—Nathan O. Jensen; Kyle Eppele

(57) ABSTRACT

Use of a filter in lieu of a secondary reflector in a reflective telescope provides compact design that eliminates the obstruction caused by the secondary reflector. The filter is selectively reflective to either the angle of incidence of radiation striking the filter or to the polarization exhibited by the radiation. An angularly sensitive filter may be constructed to either a bandpass filter or a short pass filter. A filter that is sensitive to polarization is constructed from a cholesteric liquid crystal. The filter is disposed in front of a primary reflector that comprises an aperture for collecting radiation observed by the telescope.

1 Claim, 8 Drawing Sheets

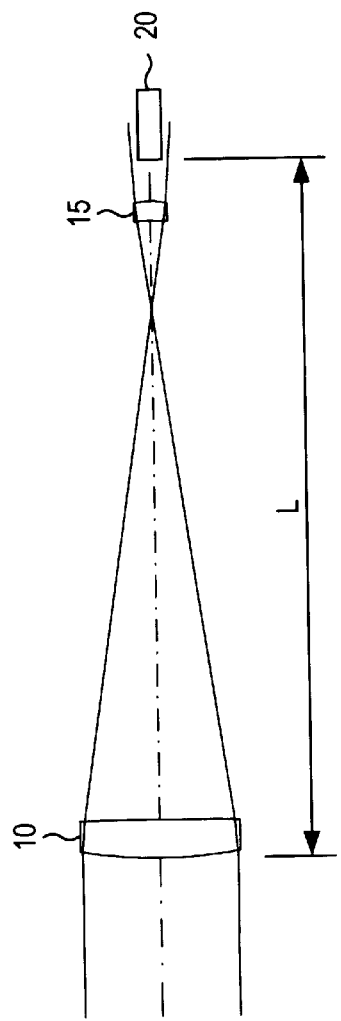
FIG. 1
PRIOR ART
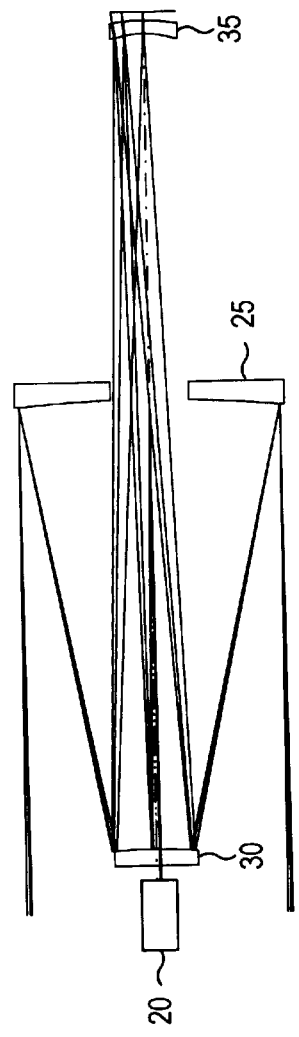
FIG. 2
PRIOR ART
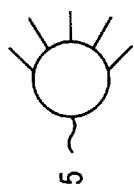
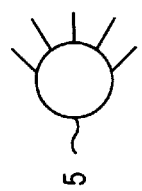

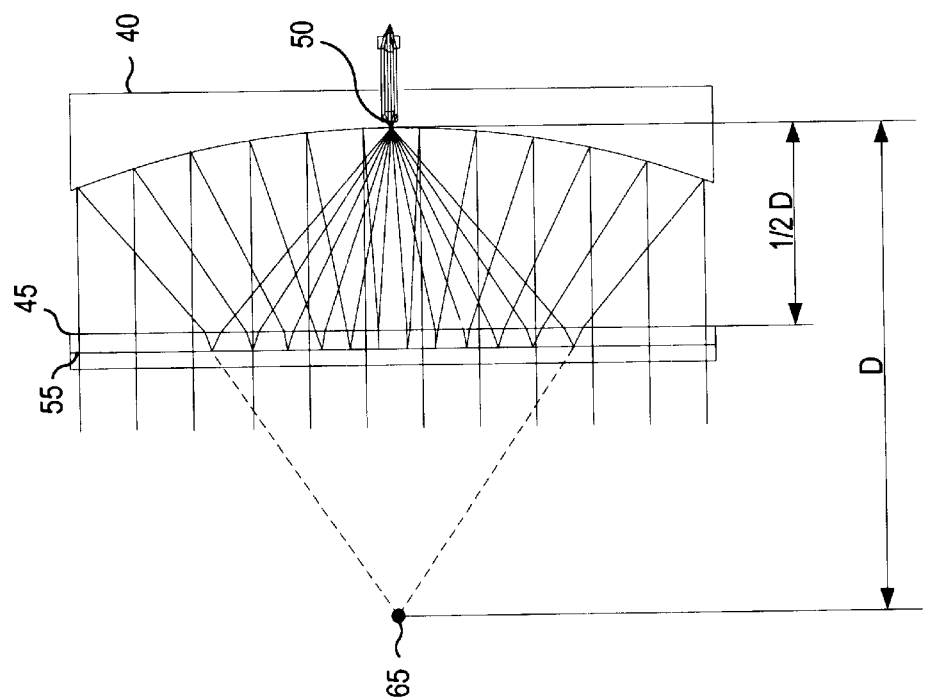
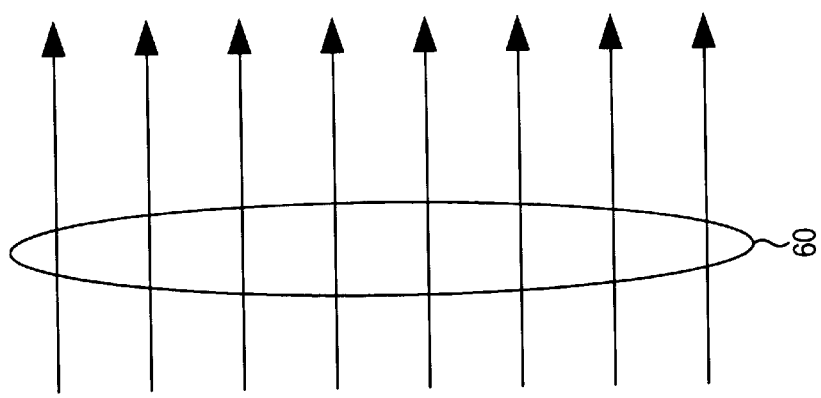
FIG. 4

METHOD AND APPARATUS FOR UNOBSTRUCTED TELESCOPIC COMMUNICATIONS

CROSS-REFERENCE TO RELATED APPLICATION

This application claims the benefit of priority application 60/239,021, filed Oct. 4, 2000, which is incorporated herein by reference in its entirety.

BACKGROUND OF THE INVENTION

1. Technical Field

The present invention pertains to the direction of electromagnetic radiation towards a target and capture of electromagnetic radiation from a target; especially light.

2. Description of the Prior Art

Various telescope configurations can be used for communicating between terrestrially based terminals through a technique called free-space optical communications (FSOC). Generally, FSOC systems use a laser beam directed from a first opposing terminal and transmit that laser beam to a second opposing terminal. When the two laser beams lock on to each other, they provide two-way communication between the terminals. Of course, terminals need not be based terrestrially; one or both terminals involved in two-way communications can be space-borne. Also, communication can be only in one direction.

The selection of a telescope configuration influences almost all of the performance parameters in an FSOC system. For example, the size, weight, performance, and assembly complexity are all factors that contribute to system effectivity and deployment cost. The selection of the telescope type usually starts by trading off the performance offered by an unobscured telescope against the performance offered by an obscured system. Some of the earliest telescopes ever fabricated utilized refractive elements. These telescopes are very simplistic and can utilize commonly available optical components. Refractive telescope designs provide good overall optical performance and are easy to assemble. However, the materials used in refractive telescope technology are generally heavy, and can be more difficult to athermalize and correct for chromatic aberration. And most importantly, refractive telescopes are mechanically long in length, a trait incompatible with most portable applications. Infrared (IR) materials typically exhibit higher indices of refraction and can be made more lightweight. Use of such IR materials, though, requires additional care during alignment because visible alignment telescopes cannot be used. This can drive up the overall cost of system deployment.

Using reflective surfaces is another approach to forming a telescope. A popular telescope configuration comprises two reflective surfaces that fold an image path into a smaller and more compact package. There are two types of reflective telescope configurations known today; the on-axis configuration and the off-axis configuration. On-axis reflective designs can be easily manufactured and assembled and offer better control of aberrations compared to off-axis designs. There are many design forms that may be considered such as confocal paraboloids, Ritchey-Chrétien and classical Cassegrain types. Many manufacturing options are available such diamond turning, conventional polishing and replication. Substrate material options may also include glass types, metals and composite substrates. In the case of larger telescopes, a lightweighted approach can be employed to minimize the mass of the telescope assembly.

One significant difference between refractive and on-axis reflective configurations is that the reflective design has some of its incoming rays obscured. The effect of obscuring these rays becomes apparent when analyzing the optical throughput of an FSOC system. In these reflective configurations, the center-most rays entering the telescope are obscured from view. And because these, center-most rays have the greatest power density in a typical incoming Gaussian beam profile, much of the power transmitted by the sending side of an FSOC is lost. This makes obscured systems less desirable because of the reduced power efficiency vis-à-vis an unobscured telescope.

The throughput power efficiency of an unobscured telescope may allow the system to use a less powerful and less expensive laser. These types of cost benefits could easily be outweighed by the cost associated with manufacturing an unobscured refractive telescope assembly. Traditional reflective telescopes are cost-effective, but are less efficient optically. Herein lies the basic problem with the known art and the balancing of performance parameters that must be accomplished in any new FSOC system design.

There are reflective telescope designs that provide an unobscured aperture. These designs combine the compact nature of a reflective design with an unobscured aperture like a refractive design, but these are typically off-axis structures. Off-axis reflective designs have the advantage of offering an unobscured aperture. This enables maximum throughput of the Gaussian beam profile for the transmitted signal. Also, these designs have the potential to be athermalized and achromatized with the correct material selection. The off-axis approach suffers from increased field aberrations compared to on-axis systems, and can be more difficult to manufacture, assemble and align.

The structure of the telescope used in an FSOC is not the only system component that affects overall performance. A complete optical throughput budget for each FSOC generally considers several factors that contribute to optical loss. There are several sources of optical loss including material absorption, coating absorption and reflection, scattering, and free-space propagation loss. Polarization can also significantly affect the signal-to-noise ratio in an FSOC system if the design does not account for polarization. All the optical coatings in a system need to be cognizant of the polarization of the light that carries the data. Beam-splitting devices are especially sensitive to polarization effects.

SUMMARY OF THE INVENTION

Ideally, an FSOC system would benefit most if a telescopic device could be constructed that combined the unobstructed view offered by a refractive design together with the compact-size, reduced weight and low-cost of a reflective design. The present invention offers a unique combination of these features. Specifically, the present invention uses a reflective approach in order to collapse the overall size of the telescope. In contrast with traditional reflective designs, the present invention does not include a secondary reflector that can obscure the field-of-view. This one distinguishing feature, as embodied in the present invention, can be applied to FSOC systems or to other applications where electromagnetic radiation needs to be either directed to a remote target or collected from a remote source. It should be noted, that the method and apparatus of the present invention can be utilized throughout the entire electromagnetic spectrum, and that the scope of the present invention should not be limited to that portion of the electromagnetic spectrum comprising light.

Replacing the secondary reflector in the present invention is a specialized filter exhibiting special reflective properties. In a first example embodiment of the present invention, the filter is disposed in front of a primary reflector and allows electromagnetic radiation of a first polarization to pass through the filter. The filter reflects electromagnetic radiation of a second polarization. The effect of this selective reflection capability is to allow appropriately polarized radiation from a distant source to pass through the filter and strike the primary reflector. The primary reflector, having a focal length, reflects the polarized radiation toward the filter. This process of reflection reverses the polarization of the radiation. Because the radiation is now of a second polarization, it is reflected by the filter disposed in front of the primary reflector back toward the primary reflector. Generally, the filter is made sensitive to either right or left handed circularly polarized radiation. In most applications, electromagnetic radiation comprising light waves is utilized.

In a second example embodiment, the filter that is disposed in front of the primary reflector reflects light selectively according to the angle of incidence of the radiation striking the filter. Electromagnetic radiation incident on the filter substantially normal to the filter is allowed to pass through. Electromagnetic radiation that falls on the filter at an angle not normal to the filter is reflected.

In one example method for receiving electromagnetic radiation according to the present invention, electromagnetic radiation is allowed to pass through a filter toward a primary reflector. Once the electromagnetic radiation has propagated through the filter, it is then reflected by the primary reflector back toward the filter. The electromagnetic radiation is then reflected by the filter toward an aperture substantially in the center of the primary reflector.

In one alternative to this example method, reflection of the electromagnetic radiation by the filter is dependent on the angle at which the radiation strikes the filter. Generally, the filter is fabricated so as to provide high reflectivity when radiation strikes the filter at an angle greater than some cut-off angle. Radiation incident upon the filter at less than this cut-off angle is allowed to propagate through the filter.

In a second alternative to this example method, reflection of the electromagnetic radiation by the filter is dependent on the polarization of the electromagnetic radiation striking the filter. In this alternative method, the filter allows radiation incident upon the filter of a first polarization to propagate through the filter. Radiation of a second polarization is reflected by the filter.

The present invention further comprises a method for directing electromagnetic radiation toward some distant target. Radiation is injected through an aperture that is located substantially in the center of the primary reflector. This example method provides that the radiation be reflected by the filter toward the primary reflector. Once the radiation is reflected by the primary reflector, it is allowed to pass through the filter toward the target.

In one alternative embodiment of this method, the filter selectively reflects radiation based on the radiation's angle of incidence. The filter is fabricated so as to provide high reflectivity when radiation strikes the filter at an angle greater than some cut-off angle. Radiation incident upon the filter at less than this cut-off angle is allowed to propagate through the filter.

In yet another alternative example method for directing electromagnetic radiation, the filter is sensitive to the polarization of the radiation. Electromagnetic radiation of a first polarization is again allowed to propagate through the filter. Electromagnetic radiation of a second polarization is reflected by the filter. In most embodiments of this method, the filter is sensitive to circularly polarized radiation.

The present invention further comprises an apparatus for directing radiation either to a distant target from a focal point or from a distant source toward some focal point. Embodying the method of the present invention, an example apparatus according to the present invention comprises a filter having an internal and external surface. The apparatus in this example embodiment further comprises a primary reflector that has a focal length and comprises an internal concave reflective surface and an aperture substantially in the center of the reflector. The reflector is disposed immediately behind the filter. In most embodiments, the filter is situated at a distance from the primary reflector that is one-half the focal length of the primary reflector. In some embodiments, a collimating lens is disposed behind the aperture in the primary reflector for the purpose of re-collimating light gathered by the telescope.

In one alternative example embodiment of the present invention, the filter comprises a cholesteric liquid crystal manufactured so as to be reflectively sensitive to the polarization of radiation incident thereon. The present invention provides for two different physical structures to support the cholesteric liquid crystal. In the first of these, the cholesteric liquid crystal is sandwiched between two flat pieces of glass. In the second, and preferred support structure, the cholesteric liquid crystal is deposited onto a substrate. It should be noted that the scope of the present invention should not be limited to the manner in which the cholesteric liquid crystal is supported. In some embodiments that comprises the cholesteric liquid crystal, an internally-aligned quarter-wave retarder is disposed immediately behind the primary reflector concentric with the aperture therein. The purpose of the quarter-wave retarder is to accept linearly polarized radiation from a source and transform it into circularly polarized radiation. The circularly polarized radiation can then be reflected by the filter back toward the primary reflector. As the circularly polarized radiation is reflected by the primary reflector, it is converted from one direction of circular polarization to the other allowing it to pass through the filter instead of being reflected.

In another alternative example, either a bandpass filter or a short pass filter comprises the present invention. Either the bandpass or short pass filters are constructed so as to make the filter reflectively sensitive to the angle of incidence at which radiation strikes the filter. The support mechanisms for the bandpass or short pass filter is analogous to that used for the cholesteric liquid crystal. The bandpass or short-pass filter can be sandwiched between two flat pieces of glass or deposited onto a substrate. Again, the support mechanisms used to hold the bandpass or short-pass filter in place relative to the primary reflector should not be considered as limiting the scope of the present invention.

In some embodiments of a radiation directing device according to the present invention comprising either the cholesteric liquid crystal filter, the bandpass filter, or the short pass filter the directing device itself may further comprise either an emitter or a detector disposed at the aperture comprising the primary reflector. In some alternative embodiments, the emitter or the detector may be disposed remotely from the primary reflector and coupled to the aperture using a radiation channel. Depending on the wavelength of electromagnetic radiation that a particular radiation directing device has been designed to operate with, the radiation channel may be an optical fiber.

In another example embodiment of the present invention, a beam-splitter may further comprise the present invention.

In this case, the beam-splitter is disposed immediately behind the primary reflector. An electromagnetic radiation emitter and an electromagnetic radiation detector are coupled to the beam-splitter. This provides for the capability of simultaneously receiving or transmitting electromagnetic radiation using the device of the present invention.

BRIEF DESCRIPTION OF THE DRAWINGS

The foregoing aspects are better understood from the following detailed description of one embodiment of the invention with reference to the drawings, in which:

FIG. 1 is a pictorial diagram of a refractive telescope known in the prior art;

FIG. 2 is a pictorial diagram of a reflective telescope known in the art;

FIG. 4 is pictorial representation of an unobstructed reflective telescope that depicts the path taken by electromagnetic radiation entering the telescope;

DETAILED DESCRIPTION OF THE INVENTION

Figure 3:
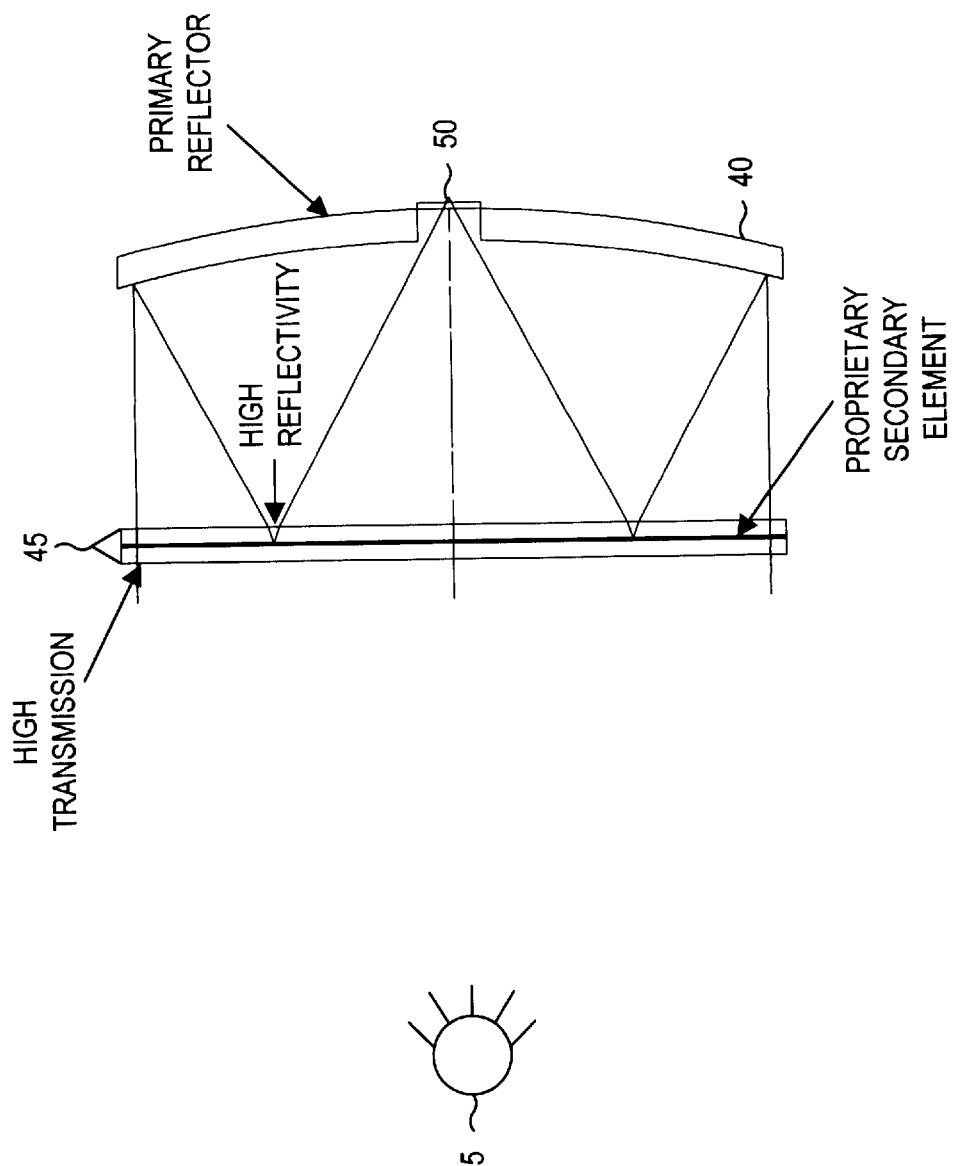
FIG. 3 is a pictorial representation of one example embodiment of an unobstructed reflective telescope according to the present invention.

FIG. 1 is a pictorial diagram of a refractive telescope known in the prior art. In this prior art telescopic mechanism, radiation from a remote source 5 was collected by a first focusing element 10 and then through a second focusing element 15. In those prior art systems where an electronic detection means was included, the detector 20 was disposed immediately behind the second focusing element 15. This prior art telescopic mechanism offered several key advantages. First, the optical path was entirely unobstructed. This meant that all of the electromagnetic radiation emanating from the distant source 5 could be collected, concentrated by the telescope and delivered to the detector 20. Also, the refractive telescope was exceptionally simple to build. The optical components merely needed to be held in mechanical relation to each other. One primary drawback to such refractive mechanisms is the overall size, and specifically the length L of the telescope. In many applications, it is the excessive overall length of the resulting telescope that makes refractive technology unappealing.

FIG. 2 is a pictorial diagram of a reflective telescope known in the art. Because the overall length of the telescope needs to be reduced for certain applications, reflective focusing elements were combined to form a reflective telescope. Electromagnetic radiation emanating from a distant source 5 enters a reflective telescope and first strikes a primary reflector 25. The primary reflector 25 comprises curvature that results in a focal length. The primary reflector 25 focuses radiation onto a secondary reflector 30 also comprising a curved surface. The secondary reflector 30 folds the optical path back to a tertiary reflector 35 that finally focuses energy collected from the remote source 5 to a detector 20 normally disposed behind the secondary reflector 30.

Although the length of a telescopic system can be substantially reduced through the use of such reflective optics, the reflective telescope has several inherent drawbacks. Among these, the reflective telescope is difficult to manufacture. The reflective elements must be ground by precisely. Further complicating fabrication of these reflective elements, is the need to introduce an aperture into both the primary 25 and secondary 30 reflectors. One very important shortcoming in this design is the fact that a secondary reflector 30 poses an obstruction to electromagnetic radiation emanating from the remote source 5. This problem is exacerbated by the fact that energy from the remote source 5 proximate to the centroid of the source carries the preponderance of information in an FSOC system and this centroid is obscured from the field of view of such a reflective telescope.

FIG. 3 is a pictorial representation of one example embodiment of an unobstructed reflective telescope according to the present invention. In this example embodiment, the unobstructed telescope comprises a primary reflector 40 and a filter 45. In operation, a distant source 5 directs electromagnetic radiation toward the telescope. The electromagnetic radiation first passes through the filter 45. Having passed through the filter, the electromagnetic radiation is reflected by the primary reflector 40. This electromagnetic radiation is reflected by the filter 45 and directed toward an aperture 50 substantially in the center of the primary reflector 40.

FIG. 4 is pictorial representation of an unobstructed reflective telescope that depicts the path taken by electromagnetic radiation entering the telescope. In most embodiments, the distance from the aperture 50 to the reflective surface 55 of the filter 45 is set to approximately one-half the focal length D of the primary reflector 40. Collimated energy 60 enters the telescope from a distant source. Rays of energy entering the telescope further away from the center of the primary reflector 40 strike a section of the reflector having greater curvature. This causes these rays of energy to be directed toward the focal point 65 of the primary reflector 40. Before these rays reach the focal point, they are reflected by the reflective surface 55 of the filter 45. This reflection causes each array to be folded back toward the aperture 50. Essentially, this causes the actual focal point of the primary reflector 40 to be coincident with the aperture 50.

Figure 5:
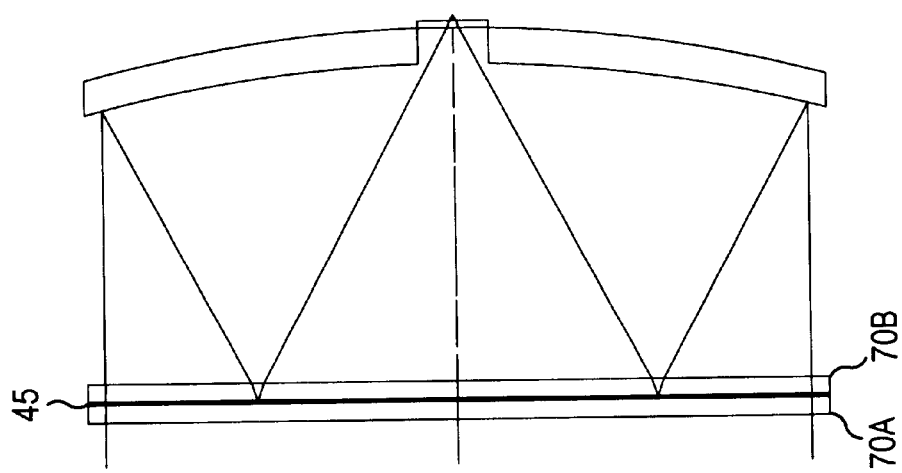
FIG. 5 is a pictorial representation that depicts one example supporting structure for a filter according to the present invention.

FIG. 5 is a pictorial representation that depicts one example supporting structure for a filter according to the present invention. In this example embodiment, the filter 45 comprises a film that is sandwiched between two pieces of flat glass (70A and 70B). The glass plates are laminated to the film and provide an optically stable surface to support the filter material.

Figure 6:
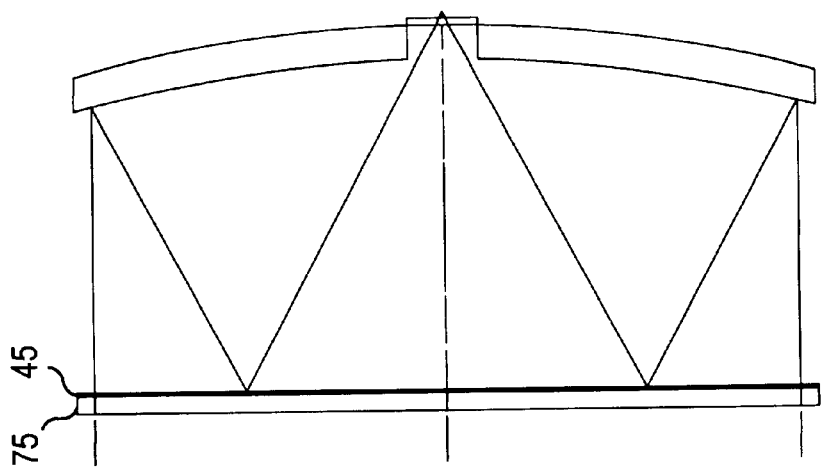
FIG. 6 is a pictorial representation depicting a second example of a structure used to support a filter according to the present invention.

FIG. 6 is a pictorial representation depicting a second example of a structure used to support a filter according to the present invention. In this example embodiment, the filter 45 is deposited onto a substrate 75. The substrate may comprises glass or any other convenient, and optically stable transparent material.

Figure 7:
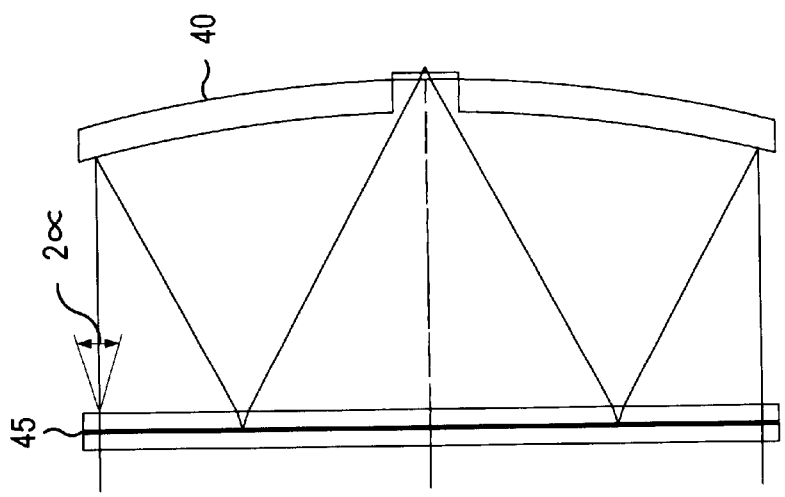
FIG. 7 is a pictorial representation of an unobstructed reflective telescope wherein the filter is angularly sensitive to reflection.

FIG. 7 is a pictorial representation of an unobstructed reflective telescope wherein the filter is angularly sensitive to reflection. In this embodiment, the filter 45 comprises a bandpass filter constructed so as to make the reflectivity of the filter sensitive to the angle at which electromagnetic radiation strikes the filter. In one example embodiment, the filter 45 is constructed so as to provide a cut-off angle, α. Any radiation striking the filter 45 within this cut off angle is allowed to propagate through the filter. Radiation incident upon the filter outside of this 2α window is reflected.

Because the field-of-view of the telescope is generally small, the incident angles falling onto the filter from outside of the telescope are near normal. The internal angles that must reflect off of the filter are very steep over a large area of the device. Only the rays that would reflect off the primary reflector near the telescope center would pass back out of the system. However, this region of the primary reflector comprises an aperture that lets the internal radiation pass. Hence, there is no appreciable loss in this central region of the primary reflector.

The bandpass filter is designed to allow maximum transmission at normal incidence. If rays strike the coating at any angle other than normal, the peak transmission shifts to the blue, and the coating now becomes very reflective at the design wavelength. Actually, only one transmission edge of the bandpass filter is utilized. The coating could actually be a short pass filter, but to maximize the shifting of the curve with angle of incidence, a bandpass filter is utilized. The advantage of the bandpass filter based embodiment of the present invention is that it does not require the use of polarized light.

Figure 8:
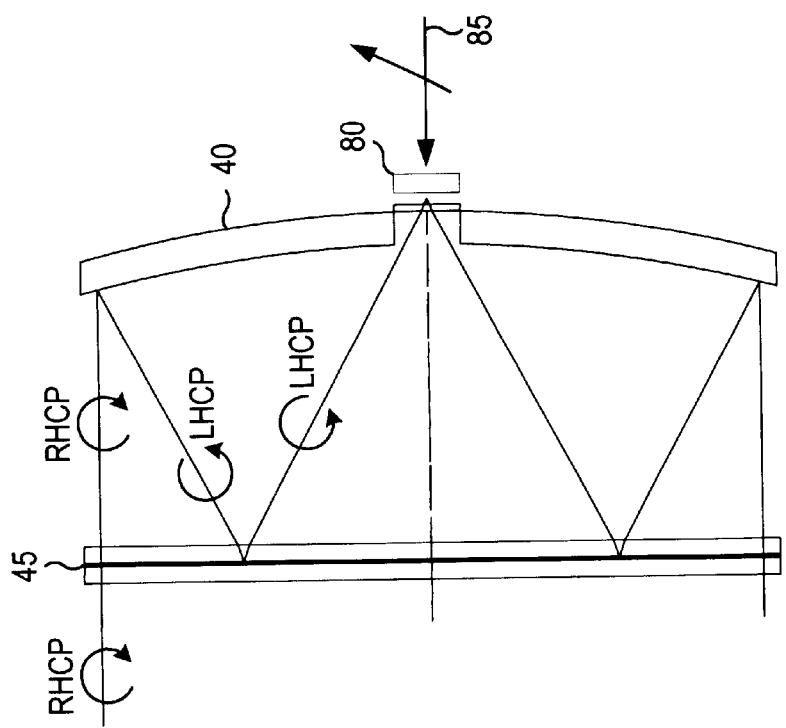
FIG. 8 is a pictorial representation of an unobstructed reflective telescope comprising a filter that is reflectively sensitive to the polarization of energy incident thereon.

FIG. 8 is a pictorial representation of an unobstructed reflective telescope comprising a filter that is reflectively sensitive to the polarization of energy incident thereon. In one example embodiment of the present invention, a cholesteric liquid crystal is sandwiched between two flat pieces of glass and forms the telescope's secondary element, i.e. the filter. The material is suspended in a crossed-linked polymer to hold its reflection band. When properly manufactured, the cholesteric liquid crystal is highly transmissive of right hand circularly polarized (RHCP) radiation, and is highly reflective of left hand circularly polarized (LHCP) radiation within a bandwidth of about the central wavelength. An additional property of the cholesteric liquid crystal device is that upon reflection, the direction of polarization does not change.

In this example embodiment of the present invention, collimated radiation being right hand circularly polarized passes through the filter 45 and enters the telescope. After being reflected by the primary reflector 40, the direction of the circularly polarized radiation is changed. In this example embodiment, right hand circularly polarized radiation is changed to left hand circularly polarized radiation after being reflected by the primary reflector 40. Since the filter in the example embodiment is reflective to left hand circularly polarized radiation, the filter reflects the radiation focused by the primary reflector 40 back toward the aperture 50 situated substantially in the center of the primary reflector 40. In situations where the telescope is used to direct energy to a distant target, an internally-aligned quarter-wave retarder 80 may further comprise the invention; being disposed immediately behind the primary mirror 40 substantially in alignment with the aperture 50 therein. When linearly polarized light 85 passes through the retarder 80, it is twisted to form of left hand circularly polarized light that can then be propagated through the specialized optics of this telescope.

Figure 9:
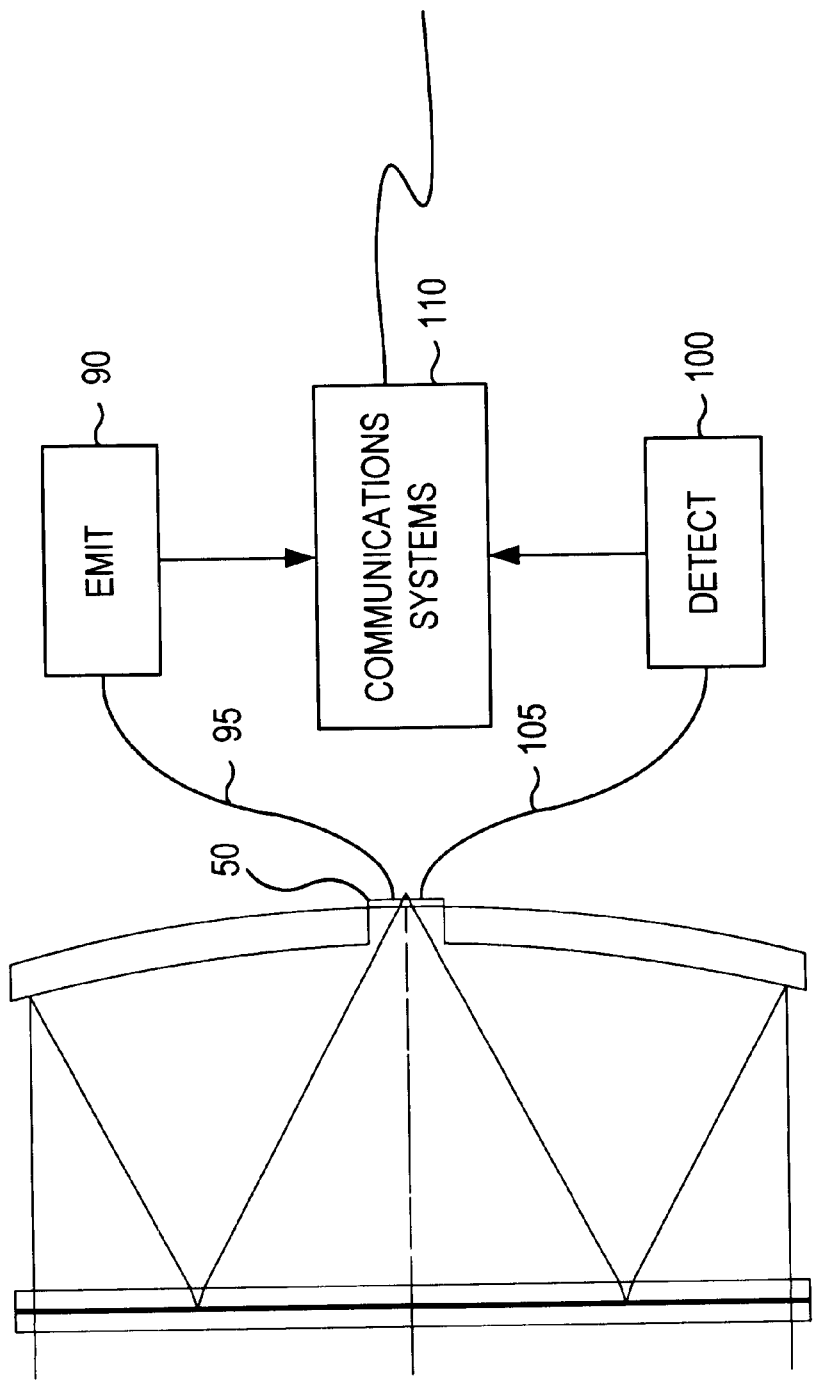
FIG. 9 is a pictorial diagram that depicts the placement of an electromagnetic emitter or an electromagnetic detector so as inject electromagnetic radiation into the telescope or to receive electromagnetic radiation collected from a distant source and focused onto the aperture.

FIG. 9 is a pictorial diagram that depicts the placement of an electromagnetic emitter or an electromagnetic detector so as inject electromagnetic radiation into the telescope or to receive electromagnetic radiation collected from a distant source and focused onto the aperture. In this example embodiment, an emitter 90 may further comprise the invention and is ordinarily coupled to the aperture 50 using a first radiation channel 95. In those embodiments designed to support operation with light, the radiation channel may be a fiber optic cable. In another example embodiment, a detector 100 may also further comprise the invention. The detector 100 is ordinarily coupled to the aperture 50 using a second radiation channel 105. The second radiation channel 105 may comprise a fiber-optic cable for telescopes designed for operation in that portion of the electromagnetic radiation spectrum that comprises light. In FSOC systems, the emitter 90 and the detector 100 are coupled to a communications system 110 that may further comprise the invention.

Figure 10:
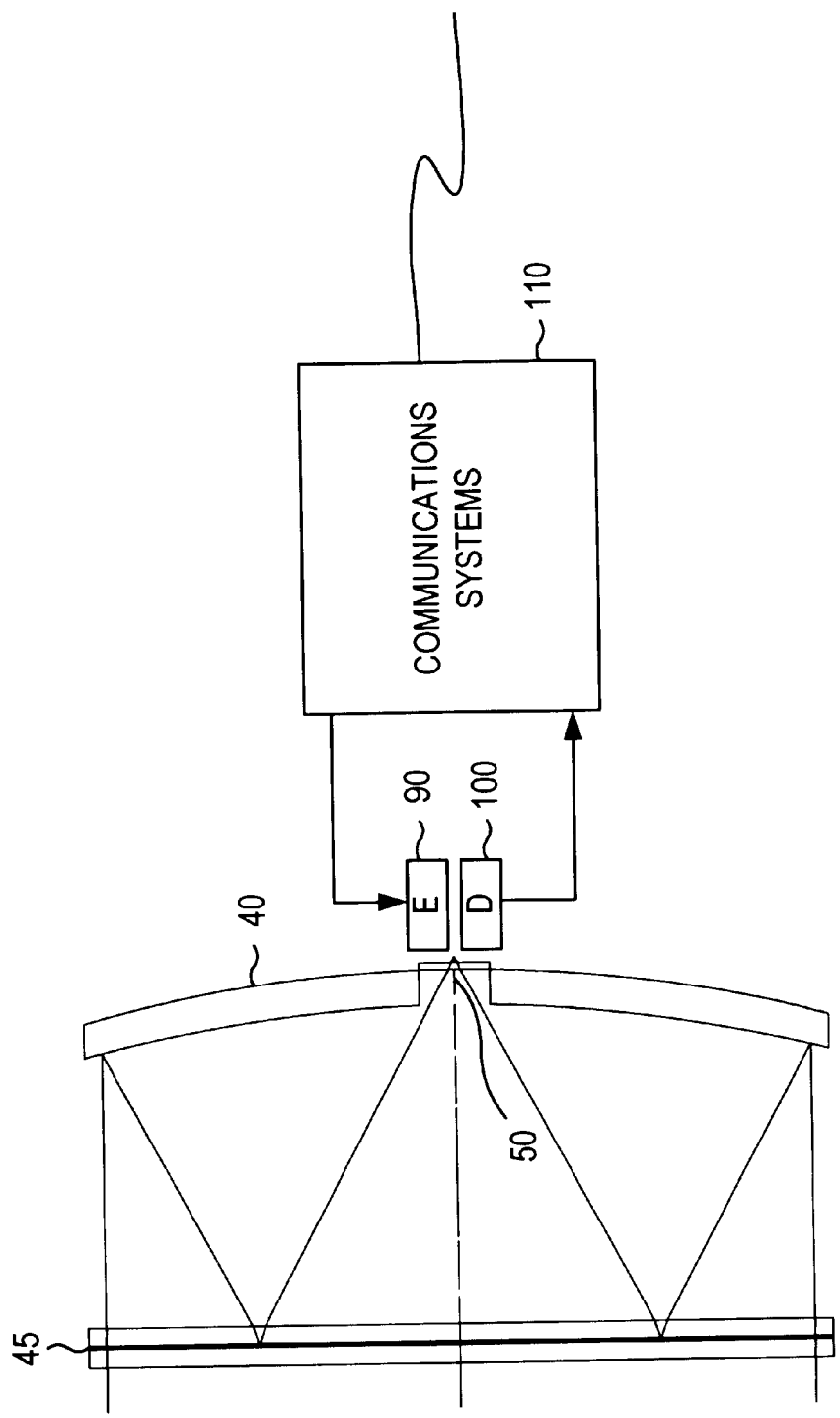
FIG. 10 is a pictorial diagram depicting the placement of a spatially separate emitter and detector.

FIG. 10 is a pictorial diagram depicting the placement of a spatially separate emitter and detector. In this alternative example embodiment, an emitter 90 and a detector 100 are disposed immediately behind the aperture 50 comprising the primary reflector 40. The emitter 90 and the detector 100 are spatially separate from each other. The emitter 90 and the detector 100 are coupled to a communications system 110 that may further comprise the present invention.

Figure 11:
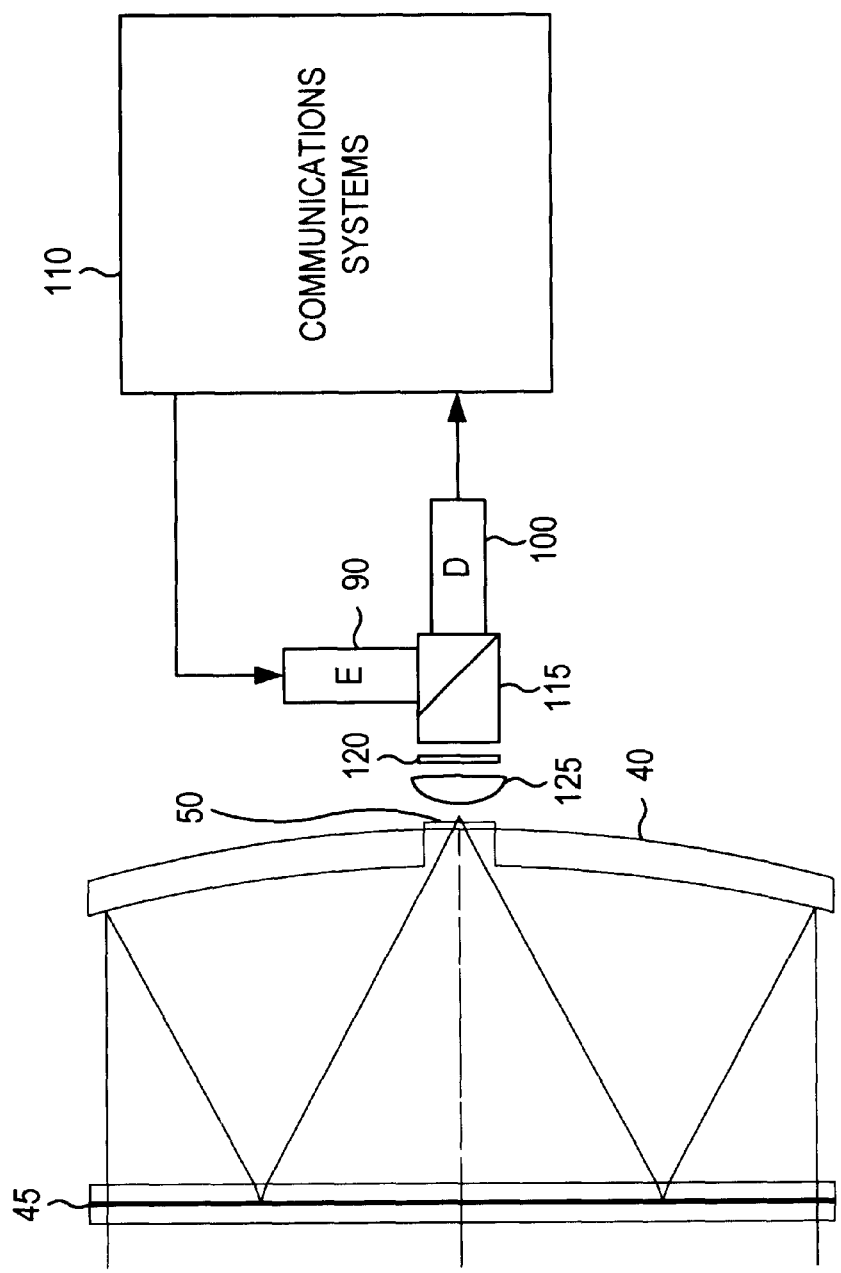
FIG. 11 is a pictorial diagram illustrating the placement of a beam-splitter or a grating immediately behind the aperture comprising the primary reflector of the present invention.

FIG. 11 is a pictorial diagram illustrating the placement of a beam-splitter or a grating immediately behind the aperture comprising the primary reflector of the present invention. In this example embodiment, a beam-splitter 115 or grating 120 is disposed immediately behind the aperture 50 comprising the primary reflector 40. Electromagnetic radiation collected by the telescope enters the beam-splitter 115 or grating 120 being disposed at the focal point of the telescope coincident at the aperture 50. The beam-splitter 115 or grating 120 directs the electromagnetic radiation to a detector 100 that further comprises the invention and is coupled to the beam-splitter 115. An electromagnetic radiation emitter 90 further comprises the invention according to this example embodiment and is also coupled to the beam-splitter 115. The beam-splitter 115 receives radiation from the emitter 90 and directs it into the telescope through the aperture 50. In some embodiment, a collimating lens 125 is disposed between the aperture and the beam-splitter 115 or grating 120. This enable light collected at the aperture to be collimated prior to entering the beam-splitter 115, the grating 120 or any other detector placed behind said collimating lens 125.

Alternative Embodiments

While this invention has been described in terms of several preferred embodiments, it is contemplated that alternatives, modifications, permutations, and equivalents thereof will become apparent to those skilled in the art upon a reading of the specification and study of the drawings. It is therefore intended that the true spirit and scope of the present invention include all such alternatives, modifications, permutations, and equivalents. Some, but by no means all of the possible alternatives are described herein.

The method and apparatus of the present invention can be used for any form of electromagnetic radiation. In the preferred embodiment, the telescope is utilized in a free space optical communications system wherein the wavelengths of energy propagating through the telescope are within those portions of the electromagnetic spectrum comprising light. In embodiments that comprise electromagnetic radiation emitters or detectors, these normally operate using light. However, the scope of the present invention is not intended to be limited to light-wave applications. For instance, the method and the structure of the apparatus for present invention can be used for radio frequency communications just as well.

We claim:

1. A radiation directing device comprising:

optical, polarization sensitive filter having an internal surface and an external surface; and concave primary reflector havina a focal length and comprising:

an interal concave reflective surface; and an aperture substantially in the center of said reflector and wherein the reflective surface is disposed substantially in opposition to the internal surface of the optical filter; and a grating disposed immediately behind the primary reflector substantially in alignment with the aperture therein.

* * * * *